P. W. PRATT.
RESILIENT TREAD.
APPLICATION FILED JULY 16, 1912.
1,087,682.
Patented Feb. 17, 1914.
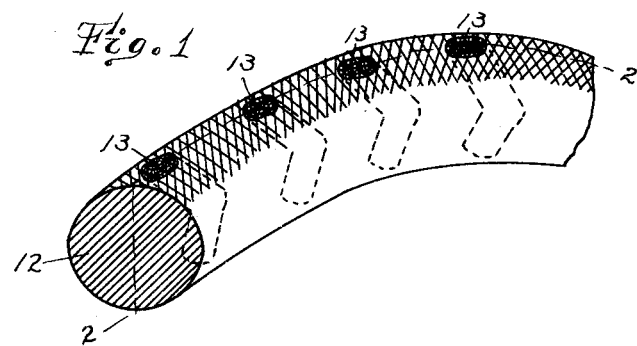
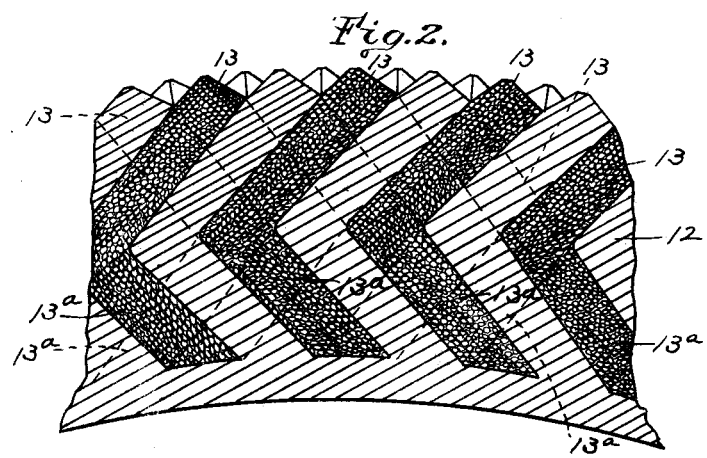
Witnesses:
F. R. Roolstone
Inventor:
P. W. Pratt

UNITED STATES PATENT OFFICE.

PHILIP W. PRATT, OF BOSTON, MASSACHUSETTS.

RESILIENT TREAD.

1,087,682.

Specification of Letters Patent. Patented Feb. 17, 1914.

Application filed July 16, 1912. Serial No. 709,648.

*To all whom it may concern:*

Be it known that I, PHILIP W. PRATT, a citizen of the United States, residing at Boston, in the county of Suffolk and State of Massachusetts, have invented certain new and useful Improvements in Resilient Treads, of which the following is a specification.

This invention relates to resilient treads, particularly in the shape of elastic tires for vehicle wheels.

The object of the invention is to provide an elastic tread having relatively inelastic inserts or plugs, of non-slipping character, the plugs being so arranged that they are operative for the purposes for which they are intended during the entire life of the elastic tread, without detracting materially from the resilience of the tread.

The invention is embodied in a resilient tread comprising a body of elastic material having a tread face which may be the outer surface of an elastic vehicle tire, and a back face which may be the inner surface of the tire bearing on the rigid rim of the wheel, a series of anti-slipping outer plugs extending inwardly from the tread face, said plugs being inclined relatively to the tread face, for a purpose hereinafter explained.

Of the accompanying drawings, forming a part of this specification, Figure 1 represents a perspective sectional view of a portion of an elastic tire embodying my invention. Fig. 2 represents a longitudinal section of a portion of an elastic tire constituting another embodiment of the invention.

In the drawings, 12 represents an elastic body which may be composed of any of the compositions of which so-called solid rubber tires are usually made. In the outer or tread face of the body 12 are inserted a series of angular or V-shaped plugs, the outer ends 13 of which are flush with the said tread face. When the body 12 is worn away sufficiently to expose the plug portions 13ᵃ, said portions continue the resistance to wear and slipping. Each of the said plugs is preferably formed by rolling a sheet of cotton duck, or other suitable textile fabric, suitably frictioned or treated with unvulcanized rubber in solution, into a solid cylinder. The plugs are inserted, while the rubber therein is unvulcanized, into the unvulcanized body 12, the whole being then subjected to vulcanizing heat in a suitable mold or container. The vulcanization of the rubber of the body 12 and plugs 14 causes a firm and intimate union between the body and the plugs and between the convolutions of the fabric of which the plugs are composed. The outer ends of the plugs form parts of the tread surface of the body 12, and not only resist wear of said tread surface, but also reduce liability of slipping or skidding.

The plugs are inclined relatively to the tread surface, instead of being at right angles therewith, as shown in the drawing. This inclination of the plugs enables them to swing or move sidewise inwardly when the surrounding portions of the body 12 are compressed, so that the plugs, which are relatively incompressible and unyielding, are displaced sidewise by inward pressure on the tread surface, and do not detract materially from the resilience of the body.

The inclination of the plug relatively to the tread face not only increases the resiliency of the tread, the plug being adapted to swing inwardly when the tread face is pressed inwardly, but also provides a greater area of non-slipping surface. In other words, the end of the cylindrical plug when beveled becomes elliptical instead of circular and presents a greater area than the end formed at right angles with the axis of the plug.

In relatively heavy tires there may be two or more rows of plugs, and the plugs of one row may have an opposite inclination to the plugs of the other row or rows, as shown by Fig. 2, where the plugs of one row are shown by full lines, and the plugs of an adjacent row by dotted lines.

I claim:—

A resilient tread for tires comprising a body of elastic material having a tread face and a series of anti-slipping outer plugs circular in cross section vulcanized in said body and extending inwardly from the said tread face and inclined relatively thereto, whereby an elliptical wearing surface is provided, each of said plugs being formed of a roll of fabric the convolutions of which are vulcanized together, said plugs having inner portions which are inclined relatively to the tread face and to the outer portions of the plugs.

In testimony whereof I have affixed my signature, in presence of two witnesses.

PHILIP W. PRATT.

Witnesses:
 FORREST R. RONKTONE,
 P. W. PEZZETTI.

Copies of this patent may be obtained for five cents each, by addressing the "Commissioner of Patents, Washington, D. C."